Patented Nov. 21, 1944

2,363,082

UNITED STATES PATENT OFFICE 2,363,082

ANESTHETIC COMPOUNDS, INTERMEDIATES, AND PROCESSES THEREFOR

William F. Ringk, Hollis, N. Y., assignor to Novocol Chemical Mfg. Co., Inc., Brooklyn, N. Y., a corporation of New York No Drawing. Application January 20, 1943, Serial No. 472,963

5 Claims. (Cl. 260—472)

This invention relates to anesthetic compounds, intermediates and processes therefor.

The principal object of the present invention is to produce a series of new compounds and intermediates, as well as to produce a simple practical process for the manufacture of the same. Although both the intermediates and compounds are primarily intended for production of local anesthetics, their use is not restricted thereto.

The invention comprises the novel products, the specific embodiments of which are described hereinafter by way of example and in accordance with which I now prefer to practice the invention.

This is a continuation-in-part of application Serial No. 406,182, filed August 9, 1941.

I have found in accordance with my invention a series of substances having the formulae:

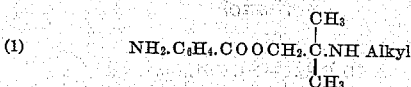

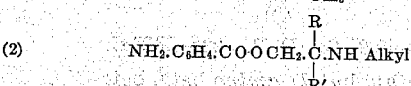

where R=H and R'=methyl or ethyl;

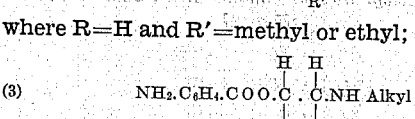

where $R^2$=a lower alkyl group. In each instance, "NH Alkyl" contains not more than ten carbon atoms.

These compounds are useful as anesthetics, though not restricted to such use, and are made from the reaction of ethanols with nitro benzoyl halides as set forth hereinafter.

Compounds falling under group 1 above are claimed in my copending application Serial No. 406,182, filed August 9, 1941. Compounds falling under group 2 are claimed in my copending application Serial No. 496,589, filed July 29, 1943. Compounds falling under group 3 are claimed herein.

These anesthetics, especially the higher members of the series, that is containing a relatively large number of carbon atoms in the alkyl group, are particularly valuable as surface anesthetics and find special use accordingly in operations such as those on the eye. Compared with butyn, which is often employed for eye operations, these anesthetics of my invention include compounds which, even in smaller doses than those administered in the case of butyn, give an equal or usually greater anesthetic effect.

The lower members of this series of anesthetics are also suitable for use in infiltration and conduction anesthesia. They have been found to be considerably more potent than procaine for this purpose.

The intermediates used in preparing the above substances are prepared in accordance with my invention through the reaction between a series of alkyl halides and ethanols described below. These in turn are reacted with nitro benzoyl halides as described below.

In preparing these ethanols, the reaction mixtures are refluxed from 24 to 96 hours, depending upon the molecular weight of the alkyl group entering the molecule. It is important to use an excess of the alkyl halide, generally two mols of halide to one of the ethanol, in order to force the reaction to form the desired compound. The following is an outline of the procedure used in preparing some members of this series.

1. Preparation of beta-ethyl amino beta, beta-dimethyl ethanol

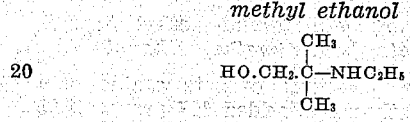

To 178 grams (2 mols) of beta-amino beta, beta-dimethyl ethanol and 436 grams (4 mols) of ethyl bromide contained in a flask was added 900 cc. of water. The reaction mixture was allowed to reflux for 24 hours, cooled and transferred to a separatory funnel. The bottom layer consisting of unreacted ethyl bromide was separated and saved, an excess over the amount required to neutralize the HBr, of sodium hydroxide was added with cooling to the fraction remaining in the separatory funnel. A white solid mass separated from the caustic solution which was then extracted with ether, the ether layer separated, dried over anhydrous sodium sulfate and the ether evaporated off. The residue was vacuum distilled and the fraction boiling at 84–93° C. at 21–24 mm. pressure was saved.

On careful fractionation, this yields a pure secondary amino alcohol which has a B. P. (boiling point) =167–169° C. at atmospheric pressure. It is a white solid having an M. P. (melting point) at 54.5–57.0° C. and when sublimed gives white, hygroscopic needles with a slight ammoniacal odor.

2. Preparation of normal propyl amino beta dimethyl ethanol

To 178 grams (2 mols) of beta amino beta beta dimethyl ethanol and 492 grams (4 mols) of normal propyl bromide contained in a flask was added 900 grams of isopropanol. The reaction mixture was allowed to reflux for 24 hours and cooled. An excess of concentrated hydrochloric acid was added to the reaction mixture and the mixture vacuum-distilled to remove all the water and isopropanol. To the residue remaining in the flask, an excess over the amount required to neutralize the added acid, of a 30% caustic alkali solution is added. A white solid mass was separated from the caustic solution. This white solid mass was then extracted with ether. The ether layer was separated, dried over a suitable drying agent such as anhydrous sodium sulfate, and the ether evaporated off. The residue was vacuum-distilled under reduced pressure and the distillate was carefully fractionated and yielded a pure secondary amino alcohol boiling at 181–186° C. and melting at 47–49° C. It is a white solid and when sublimed gives white, hygroscopic needles with a slight ammoniacal odor. The compound has the following formula:

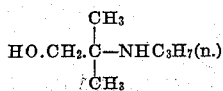

It will be noted in accordance with the above examples that where the beta alkyl group attached to the nitrogen atom is ethyl, as in Example 1, that water is preferably used as a solvent. Where the compound contains a propyl group instead of the ethyl group as in Example 2, isopropanol or similar inert solvent is employed. Instead of isopropanol, I may employ normal propanol or methanol. For the higher members of the series, that is, where such alkyl group contains 5 or more carbon atoms, i. e., starting with the amyl compounds, I prefer to carry out the reaction without any solvent. For instance, in the preparation of the octyl compound, I use the following procedure:

3. Preparation of beta (alpha-methyl heptyl) amino beta, beta dimethyl ethanol To 54 grams (0.6 mol) of beta amino beta beta dimethyl ethanol is added 117 grams (0.65 mol) of 2-bromoctane and this mixture refluxed for six hours and then allowed to cool. An excess of a 30% caustic alkali solution is added to the reaction mixture in the flask which causes the separation of a yellow liquid. This is extracted with ether. The ether layer is separated and dried over a suitable drying agent, such as anhydrous sodium sulfate. The ether is evaporated and the residue vacuum-distilled. On careful fractionation, there is obtained a pure secondary amino alcohol boiling at 250–255° C. The specific gravity at 20° C. is 0.8715. The refractive index at 20° C. is 1.4516. The compound has the following formula:

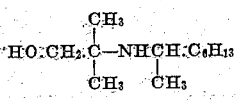

In a manner similar to the above described preparation, the other members of this series were prepared as follows:

4. Beta-isopropyl amino beta, beta-dimethyl ethanol

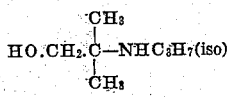

B. P.=173–177° C.  M. P.=40–42° C.  $n_{20°\,C.}^{D}$ (refractive index)=1.4442.

5. Beta-normal butyl amino beta, beta-dimethyl ethanol

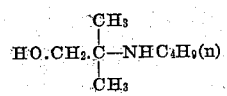

M. P.=64.5–67.0° C.  B. P.=200–203° C.

6. Beta (sec. butyl) amino beta, beta-dimethyl ethanol

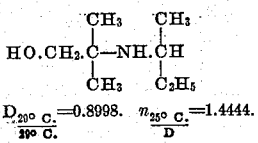

B. P.=186–190° C.  $D_{20°\,C.}^{20°\,C.}$=0.8998.  $n_{25°\,C.}^{D}$=1.4444.

7. Beta-isobutyl amino beta-beta-dimethyl ethanol

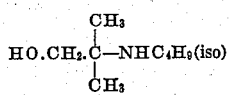

M. P.=40.0–43.5° C.  B. P.=194–196° C.

8. Beta-normal amyl amino beta, beta dimethyl ethanol

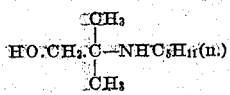

M. P.=50.5–54.0° C.  B. P.=223–230° C.

9. Beta-isoamyl amino beta, beta-dimethyl ethanol

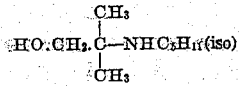

M. P.=58.0–64.5° C.  B. P.=211–215° C.

10. Beta-normal hexyl amino beta, beta-dimethyl ethanol

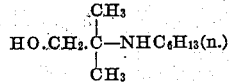

M. P.=58.6–60.0° C.  B. P.=235–238° C.

11. Beta (ethyl butyl) amino beta, beta-dimethyl ethanol

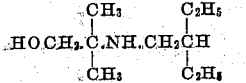

This is a liquid compound having the following constants:

B. P. at atmospheric pressure=220–226° C.  $D_{20°\,C.}^{20°\,C.}$=0.8858.  $n_{25°\,C.}^{D}$=1.4498.

12. Beta-normal heptyl amino beta, beta dimethyl ethanol

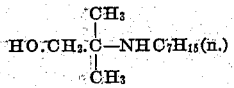

M. P.=46.0–47.2° C.  B. P.=252–259° C.

13. Beta-(beta-ethyl hexyl) amino beta, beta-dimethyl ethanol

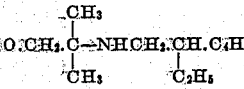

B. P.=248–256° C.  $D_{20°\,C.}^{20°\,C.}$=0.8735.  $n_{20°\,C.}^{D}$=1.4535.

14. Beta normal decyl amino beta, beta-dimethyl ethanol

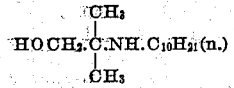

This is a solid material having an M. P.=50–53° C.  B. P. at 760 mm.=295–300° C.

The above alkyl amino ethanols are members of the beta alkyl amino beta beta dimethyl ethanol series. In a similar manner to that employed for the preparation of this series, the beta alkyl amino beta methyl ethanol series may be prepared, using the known beta amino beta methyl ethanol as one of the starting materials and reacting this with the corresponding alkyl halide, which is also known. Using this method the following secondary amino alcohols were prepared, having the following constants:

15. Beta-normal amyl amino-beta-methyl ethanol

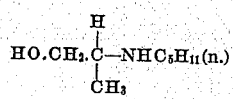

B. P.=210–220° C. at atmospheric pressure. $D_{\frac{20°\,C.}{20°\,C.}}=0.8828$. $n_{\frac{20°\,C.}{D}}=1.4457$.

16. Beta isoamyl amino beta-methyl ethanol

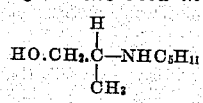

B. P.=206–214° C. at atmospheric pressure. $D_{\frac{20°\,C.}{20°\,C.}}=0.8812$. $n_{\frac{20°\,C.}{D}}=1.4445$.

Similarly, using beta amino alpha beta dimethyl ethanol, which is known, and reacting it with an alkyl halide, corresponding beta alkyl amino alpha beta dimethyl ethanols have been prepared as follows:

17. Beta-normal butyl amino alpha, beta-dimethyl ethanol

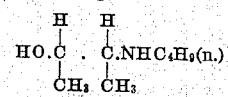

B. P.=197–205° C. at atmospheric pressure. $D_{\frac{25°\,C.}{25°\,C.}}=0.8693$. $n_{\frac{20°\,C.}{D}}=1.4423$.

18. Beta-isobutyl amino alpha, beta-dimethyl ethanol

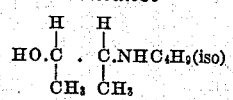

B. P.=179–187° C. $D_{\frac{22°\,C.}{22°\,C.}}=0.8711$. $n_{\frac{20°\,C.}{D}}=1.4399$.

19. Beta-normal amyl amino alpha, beta-dimethyl ethanol

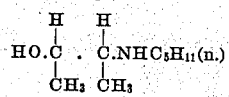

B. P.=212–220° C. at atmospheric pressure. $D_{\frac{22°\,C.}{22°\,C.}}=0.8763$. $n_{\frac{20°\,C.}{D}}=1.4442$.

20. Beta-isoamyl amino alpha, beta-dimethyl ethanol

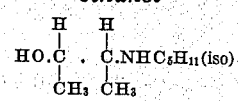

B. P.=206–213° C. at atmospheric pressure. $D_{\frac{22°\,C.}{22°\,C.}}=0.8574$. $n_{\frac{20°\,C.}{D}}=1.4429$.

21. Beta ethyl amino alpha beta dimethyl ethanol

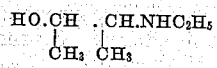

B. P.=165–170° C. $D_{\frac{24°\,C.}{24°\,C.}}=0.8782$. $n_{\frac{25°\,C.}{D}}=1.4364$.

22. Beta normal propyl amino alpha beta dimethyl ethanol

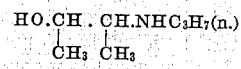

B. P.=178–180° C. $D_{\frac{25°\,C.}{25°\,C.}}=0.8816$. $n_{\frac{25°\,C.}{D}}=1.4378$.

23. Normal hexyl amino alpha beta dimethyl ethanol

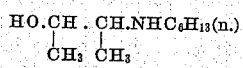

B. P.=235–236° C. $D_{\frac{23°\,C.}{23°\,C.}}=0.8707$. $n_{\frac{25°\,C.}{D}}=1.4439$.

24. Beta (alpha-methyl heptyl) amino alpha beta dimethyl ethanol

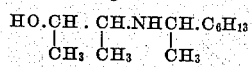

B. P.=247–251° C. $D_{\frac{24°\,C.}{24°\,C.}}=0.8635$. $n_{\frac{25°\,C.}{D}}=1.4469$.

25. Beta normal decyl amino alpha beta dimethyl ethanol

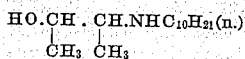

B. P.=280–286° C. $D_{\frac{24°\,C.}{24°\,C.}}=0.8436$. $n_{\frac{25°\,C.}{D}}=1.4472$.

These amino alcohols are all colorless liquids with a slight ammoniacal odor and give a positive nitroso test for secondary amino nitrogen.

The above-mentioned ethanols are condensed with the nitro benzoyl halide in order to produce the corresponding nitro benzoates which on reduction with tin or iron and hydrochloric acid constitute useful anesthetic bases.

26. Preparation of beta ethyl amino beta, beta-dimethyl ethyl para nitro benzoate

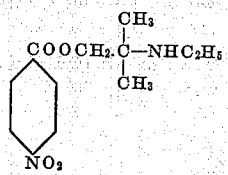

To 20 grams of beta-ethyl amino beta beta dimethyl ethanol, 8 grams of sodium hydroxide and 400 cc. of water was added all at one time with vigorous stirring, 32 grams of finely pulverized para nitro benzoyl chloride. The temperature of the reaction mixture is maintained between 30–40° C. and stirring continued until the nitro ester solidifies. The nitro ester is filtered off and washed with water until free from alkali.

The nitro ester formed above may be reduced by conventional methods, using for instance, tin and hydrochloric acid, but is preferably reduced as follows:

35 grams of beta ethyl amino beta, beta-dimethyl ethyl para nitro benzoate, 70 grams of iron filings, 9.5 cc. of concentrated hydrochloric acid and 600 cc. of water are placed in a beaker and stirred vigorously. The initial heat of reaction is not permitted to go above 50° C. When the temperature of the reaction mixture starts to fall, heat is applied in order to maintain the temperature between 40–50° C. for the entire course of the reduction. Reduction is generally complete at the end of three to four hours of vigorous stirring at which time the reaction mixture is filtered to remove the iron sludge. About 75 cc. of concentrated ammonium hydroxide solution was added to the filtrate to precipitate the amino ester which was then extracted with ether. The ether solution was evaporated and to the amino ester was added some water and the calculated quantity of concentrated hydrochloric acid to form the mono hydrochloride. After several treatments with bone charrings in water and a final recrystallization from methanol, the hydrochloride is obtained as a white crystalline substance melting at 245.0° C.–246.5° C. The amino ester in the above example is beta ethyl amino beta, beta-dimethyl ethyl para amino benzoate hydrochloride, having the following formula:

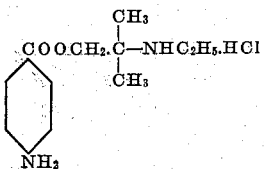

In a similar manner, with the exception that for the higher members of this series proportionately larger quantities of water are employed in the reduction, owing to the limited solubilities of the amino ester hydrochlorides in water, the other members of the series were prepared.

27. *Beta-normal propyl amino beta, beta dimethyl ethyl para-amino benzoate hydrochloride*

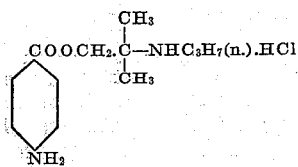

M. P.=239–240° C. from methanol.

28. *Beta-isopropyl amino beta, beta dimethyl ethyl para-amino benzoate hydrochloride*

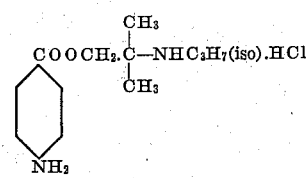

M. P.=234.5–236.0° C. from H₂O.

29. *Beta-N-butyl amino beta, beta-dimethyl ethyl para-amino benzoate hydrochloride*

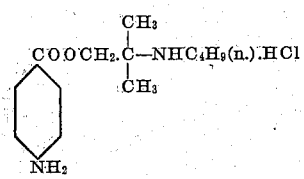

M. P.=192.0–192.5° C. from methanol.

30. *Beta (sec. butyl) amino beta, beta-dimethyl ethyl para-amino benzoate hydrochloride*

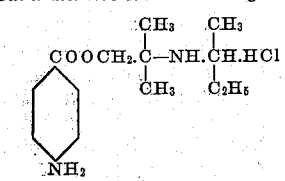

M. P.=202–205° C.

31. *Beta-isobutyl amino beta, beta-dimethyl ethyl para-amino benzoate hydrochloride*

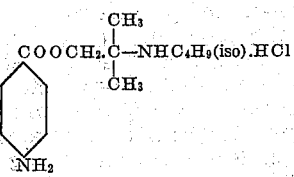

M. P.=225.8–228.0° C. from water.

32. *Beta-N-amyl amino beta, beta-dimethyl ethyl para-amino benzoate hydrochloride*

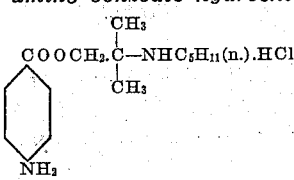

M. P.=209.0–211.8° C. from water.

33. *Beta-isoamyl amino beta, beta-dimethyl ethyl para-amino benzoate hydrochloride*

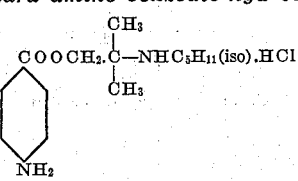

M. P.=202–203° C. from water.

34. *Beta-N-hexyl amino beta, beta-dimethyl ethyl para-amino benzoate hydrochloride*

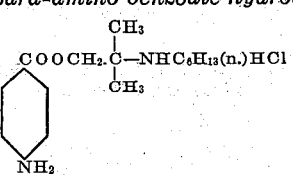

M. P.=212.5–213.5° C. from water.

35. *Beta (ethyl butyl) amino beta, beta-dimethyl ethyl para amino benzoate hydrochloride*

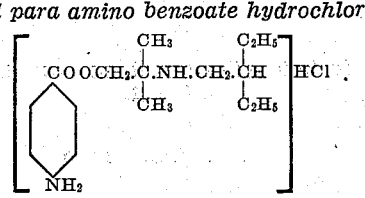

This is a solid material having an M. P.=198–199.5° C.

36. *Beta-N-heptyl amino beta, beta-dimethyl ethyl para-amino benzoate hydrochloride*

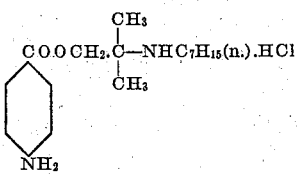

M. P.=197.0–198.0° C. from water.

37. *Beta-(alpha-methyl heptyl) amino beta, beta-dimethyl ethyl para amino benzoate hydrochloride*

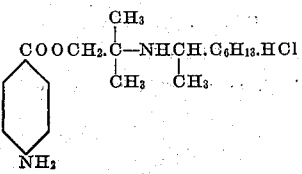

M. P.=135–137° C. from water. The formate salt of this compound, white crystals from dioxane, melts at 107–108.5° C.

38. *Beta-(beta-ethyl hexyl) amino-beta, beta-dimethyl ethyl para amino benzoate hydrochloride*

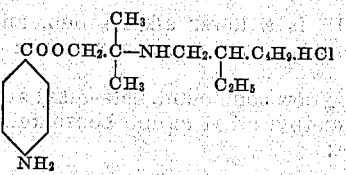

M. P.=154–158° C. Recrystallized from water.

39. *Beta normal decyl amino beta, beta-dimethyl ethyl para amino benzoate hydrochloride*

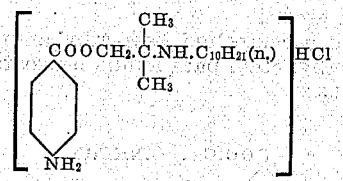

This is a solid material having an M. P.=141–142° C.

40. *Beta-normal butyl amino beta, beta-dimethyl ethyl ortho amino benzoate*

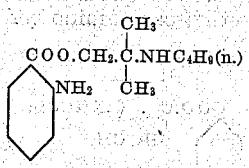

M. P.=68–68.5° C.

41. *Hydrochloride of beta-normal butyl amino beta, beta-dimethyl ethyl meta amino benzoate*

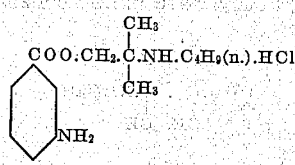

M. P.=205–207° C. Recrystallized from water.

42. *Hydrochloride of beta normal amyl amino beta-methyl ethyl para-amino benzoate*

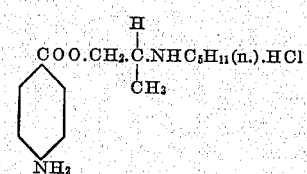

M. P.=186.5–187.5° C. Recrystallized from water.

43. *Hydrochloride of beta isoamyl amino beta-methyl ethyl para amino benzoate*

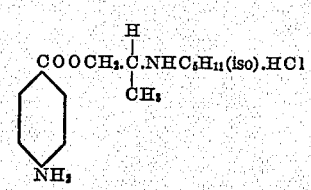

M. P.=195–196.5° C. Recrystallized from water.

44. *Hydroiodide of beta-normal butyl amino alpha, beta-dimethyl ethyl para amino benzoate*

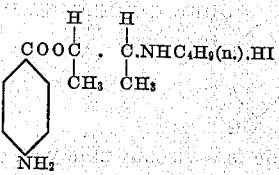

M. P.=214–218° C. Recrystallized from water. The formate salt of this compound, white crystals from dioxane, melts at 138.2–140.4° C.

45. *Hydroiodide of beta-normal amyl amino alpha, beta-dimethyl ethyl para-amino benzoate*

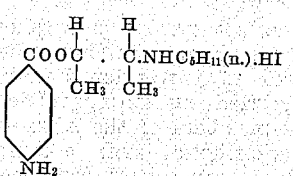

M. P.=203–205° C. Recrystallized from water.

46. *Hydroiodide of beta-isoamyl amino alpha, beta-dimethyl ethyl para amino benzoate*

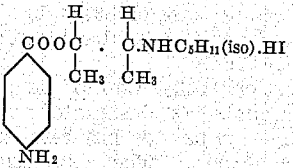

M. P.=205–209° C. Recrystallized from water. The formate salt of this compound, white crystals from dioxane, melts at 134–136° C.

47. *Beta ethyl amino alpha, beta-dimethyl ethyl para amino benzoate hydrochloride*

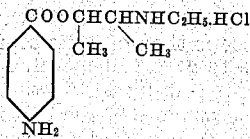

Hydrochloride salt is a viscous oil.

48. *Beta-normal propyl amino alpha, beta dimethyl ethyl para-amino benzoate hydroiodide*

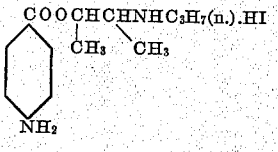

M. P.=162–165° C. from isopropanol.

49. *Beta-N-hexyl amino alpha beta-dimethyl ethyl para-amino benzoate formate*

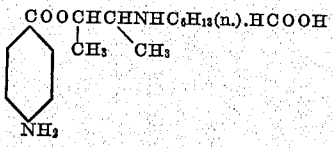

M. P.=129–134° C. from dioxane.

50. *Beta (alpha-methyl heptyl) amino alpha beta-dimethyl ethyl P-amino benzoate hydrochloride*

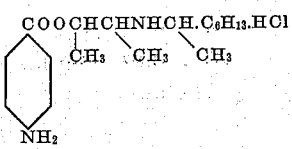

Hydrochloride is a viscous pale yellow liquid.

51. *Beta normal decyl amino alpha beta dimethyl ethyl para amino benzoate hydrochloride*

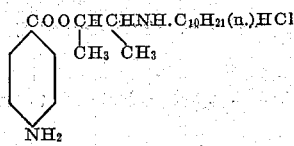

Hydrochloride is a viscous pale yellow liquid.

Clinical tests on anesthetics produced in accordance with my invention herein described have been carried out and have demonstrated that various members of the series show great strength as anesthetics giving a rapid and profound anesthesia. In several instances an eye has been anesthetized with a single standard dose of the anesthetic and remained anesthetized for a longer period than any other eye anesthetic of which I am aware.

The appended claims are intended to define not only an amino base or bases, but also a salt thereof, such as the hydrochloride, sulfate, formate, or the like.

The expression "alkyl amino" as used in the claims is intended to designate not only the normal amino compounds but also any isomers of the alkyl group. The expressions "octyl amino" and "decyl amino" similarly define both normal compounds and isomers thereof.

While I have described my improvements in great detail and with respect to preferred forms thereof, I do not desire to be limited to such details and forms since many changes and modifications may be made and the invention embodied in widely different forms without departing from the spirit and scope thereof in its broader aspects. Hence, I desire to cover all modifications, forms and embodiments coming within the language or scope of any one or more of the appended claims.

What I claim as new and desire to secure by Letters Patent is:

1. The new compound, beta-alkyl amino beta substituted ethyl amino benzoate having the formula:

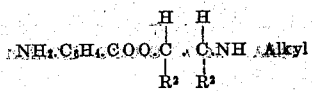

where $R^2$ is a lower alkyl group, and the NH alkyl group contains no more than 10 carbon atoms.

2. The new compound, beta-alkyl amino alpha, beta-dimethyl ethyl amino benzoate having the formula:

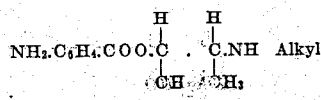

in which the alkyl group contains no more than 10 carbon atoms.

3. The new compound, beta-ethyl amino alpha, beta-dimethyl ethyl para amino benzoate having the formula:

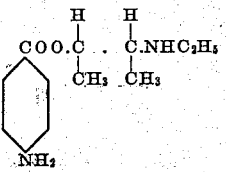

4. The new compound, beta-octyl amino alpha, beta-dimethyl ethyl para amino benzoate having the formula:

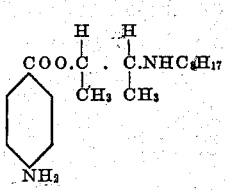

5. The new compound, beta-decyl amino alpha, beta-dimethyl ethyl para amino benzoate having the formula:

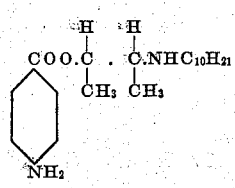

WILLIAM F. RINGK.